Oct. 11, 1966  A. WAGNER ETAL  3,277,806
SLOTTED SHUTTER FOR A PHOTOGRAPHIC CAMERA
Filed May 28, 1964  5 Sheets-Sheet 1

INVENTORS
ADAM WAGNER
BY  ERWIN NEURATH

Toulmin & Toulmin
Attorneys

INVENTORS
ADAM WAGNER
BY ERWIN NEURATH

Toulmin & Toulmin
Attorneys

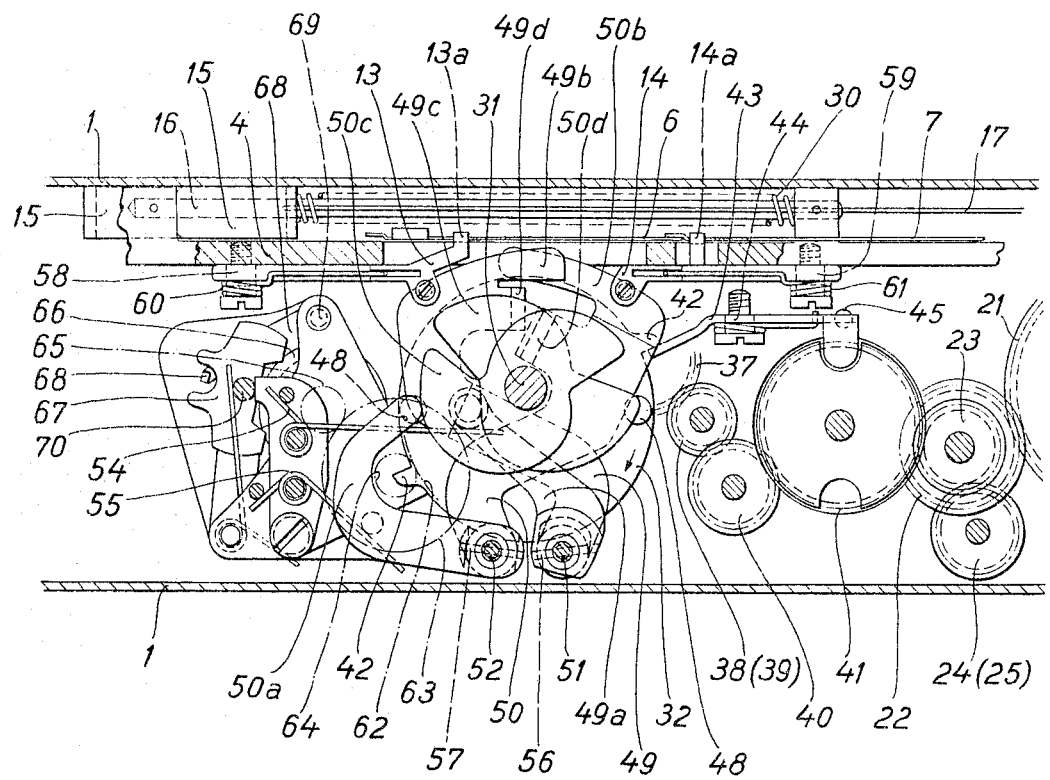

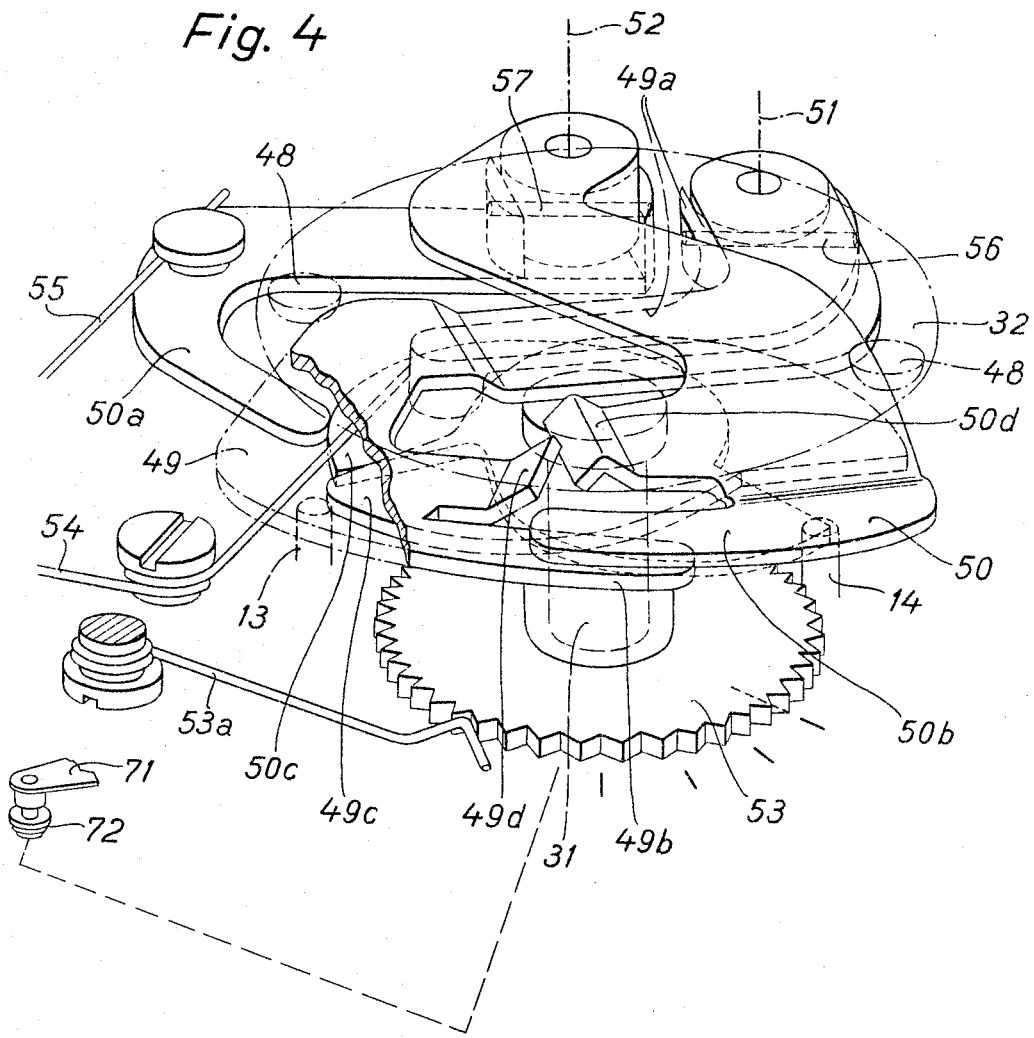
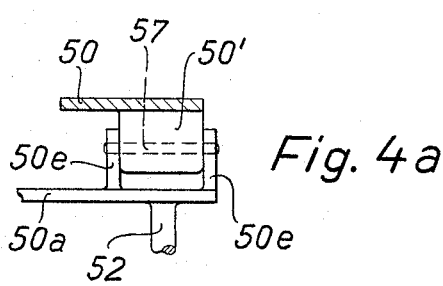

Oct. 11, 1966    A. WAGNER ETAL    3,277,806
SLOTTED SHUTTER FOR A PHOTOGRAPHIC CAMERA
Filed May 28, 1964    5 Sheets-Sheet 5

INVENTORS
ADAM WAGNER
BY  ERWIN NEURATH

Toulmin & Toulmin
Attorneys

United States Patent Office 3,277,806
Patented Oct. 11, 1966

3,277,806
SLOTTED SHUTTER FOR A PHOTOGRAPHIC CAMERA
Adam Wagner, Garbenheim, Kreis Wetzlar, and Erwin Neurath, Giessen-Klein Linden, Germany, assignors to Ernst Leitz G.m.b.H., Wetzlar, Germany
Filed May 28, 1964, Ser. No. 370,836
Claims priority, application Germany, June 22, 1963, L 45,175
15 Claims. (Cl. 95—55)

The present invention relates to the shutter mechanism of a photographic camera and more particularly it relates to the shutter mechanism of the focal plane variety.

Generally, the mechanism for controlling the speed of the shutter consists of a time controlling column which is equipped with cams or radial curves which are adjusted with respect to each other. When the shutter is released and runs off, the time controlling column rotates through a complete revolution or nearly so whereby the cams or radial curves release the blocking mechanisms of the individual focal plane shutters. When the shutter is subsequently wound, the time controlling column is turned back to its original starting position against a spring force. This means that the time controlling column will rotate in different directions during the running off and the winding up of the shutter. The term "run off" as used herein refers to the movement of the shutter mechanism to expose a film in the camera. The term "winding up" refers to the movement of the shutter mechanism back to its starting position following one film exposure and preparatory to the next film exposure.

In contrast to the above, the present invention has time controlling column means which turn only during the run-off of the shutter and which always turn in only one direction. This construction may be used in a photographic camera which has a slotted shutter consisting of two rigid individual slides which are spring loaded. It may also find application in the slit type rotary disc shutter means.

The apparatus according to this invention is dependable, rugged and of relatively simple construction.

The time controlling column means of this invention generally comprises a run-off column and a wind-up column which are connected to each other by a spring which serves as a force storage unit. The run-off column has at least one blocking cam connected therewith which engages a blocking lever to prevent rotation of run-off column during the tensioning of the shutter. Release of the run-off column occurs when the blocking lever is disengaged from the blocking cam.

There is also a blocking or breaking device used in connection with the wind-up column which prevents rotation of the wind-up column when the shutter is in its tensioned state and also when the shutter is run off. This blocking device is constructed as a cam which cooperates with mating recesses on the wind-up column which is lifted to permit the wind-up column to be rotated only during the winding up of the shutter. The wind-up column is also operatively connected with the shutter wind-up mechanism.

Each one of the rigid slides of the shutter has time setting levers operatively connected therewith. The run-off column has a drum or disc portion connected therewith on which at least one actuation cam is located. There are blocking levers for each of the slides of the shutter which are operatively connected with the pertaining time setting levers. The time setting levers are adjustable with respect to each other and with the actuation cams on the drum portion of the run-off column. When the run-off column is released, the actuation cam will rotate with the run-off column and engage first the time setting levers of the first slide, which will then release the first blocking lever of the first slide. Upon further rotation, the actuation cam will engage the time setting levers of the second slide which will release the blocking lever of the second slide, permitting the second slide to be actuated. The time difference between the actuation of the time setting levers for the first and second slides is adjustable and represents the shutter exposure.

For adjusting the time setting levers with respect to each other, two coaxially supported cam discs are provided. The time setting levers are spring tensioned to bear against their pertaining cam disc, and the cam discs are adjusted by time setter means which are located on the outside of the camera housing.

The run-off column runs with the same velocity and direction for each taking of a picture. The number of blocking and actuation cams may be present in a plurality.

In a preferred embodiment of this invention, two actuation cams are located on the drum portion of the run-off column. As a result, there will be two shutter tripping steps for a full revolution of the run-off column, i.e., one run off of the shutter will require one half revolution of the run-off column. In this connection also, there are two blocking cams which are located 180° apart on the drum portion of the run-off column.

The time difference with which the slides are released at the constant velocity of the run-off column mentioned above will depend only upon the relative positions of the time setting levers with respect to each other. The further they are apart, the longer will be the time interval between release of the individual slides, and the converse is true.

Also included in this invention is a retarding unit which changes the velocity of the run-off column in order that slower speeds are obtained. The velocity of the run-off column at the slower velocity is constant and can be switched in and out at will by means of a slow speed lever which is actuated from outside the camera housing. Thus for each setting of the time setting levers, there will be two shutter speeds available, i.e., one when the velocity of the run-off column is not retarded or braked and another when it is.

The object of this invention is to produce improved time controlling means for the shutter means of a camera.

Another object of this invention is to produce time controlling column means which turn in the same direction during run off and tensioning of the shutter of the focal plane type.

Another object of this invention is to produce an improved time controlling column means for the shutter mechanism of a camera in which more than one release of the shutter mechanism may be had for each revolution of the time controlling column means.

These and other objects and advantages of this invention will be more readily understood from the following description and drawings in which:

FIGURE 3 is a view of the time-controlling mechanism looking in the direction A of FIGURE 2;

FIGURE 4 is a perspective view of the time-setting lever with the time-setting means;

FIGURE 4a shows further detail of one of the time-setting levers;

Figure 1:
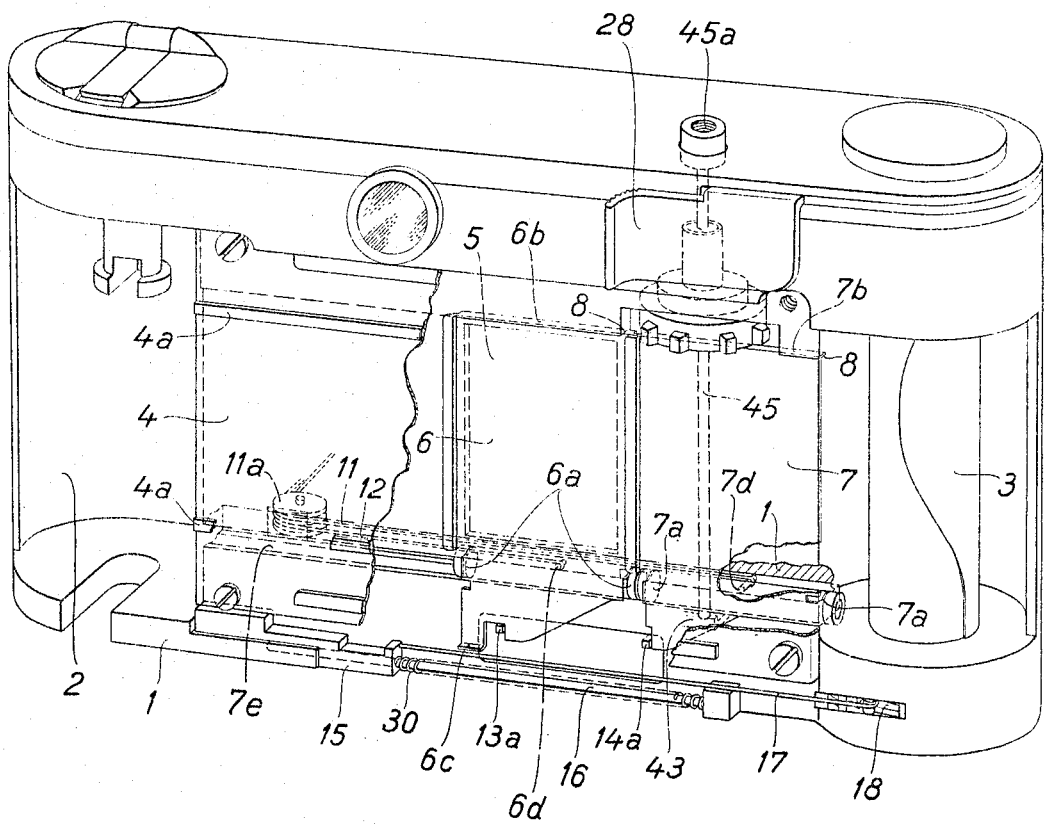
FIGURE 1 shows the view of a camera schematically, in perspective, with the rear wall removed, where the exposure gate plate and the shutter slides are partially shown as in section.

Referring to the drawings in detail, FIGURE 1 shows a schematic view of this invention in perspective with the rear wall of the camera removed. At one side of the housing 1 is a chamber 2 in which the film reel or cartridge is placed in known manner. At the other side of the camera housing, the take up reel 3 is shown.

As pictures are taken, the film is transported from chamber 2 to take up reel 3 over a plate generally designated 4. While being transported, the film edges are supported by guide rails 4a secured to plate 4. The plate 4 has an exposure gate 5 therein through which the film is exposed.

There are two rigid closing slide plates 6 and 7 which are suitably mounted to slide in longitudinal grooves in front of the picture gate opening 5. Slide plates 6 and 7 each have lobe members 6a and 7a, respectively, which are bent at right angles thereto and which lobe members slide in the mating longitudinal groove 7e. The upper ends of the slide plates 6 and 7 each have lobe members 6b and 7b which are used to guide the upper ends in groove 8 as shown. When tensioned and ready for use, slide plate 6 is positioned in front of the exposure gate 5 and plate 7 is positioned to the right of plate 6 as shown.

Figure 2:
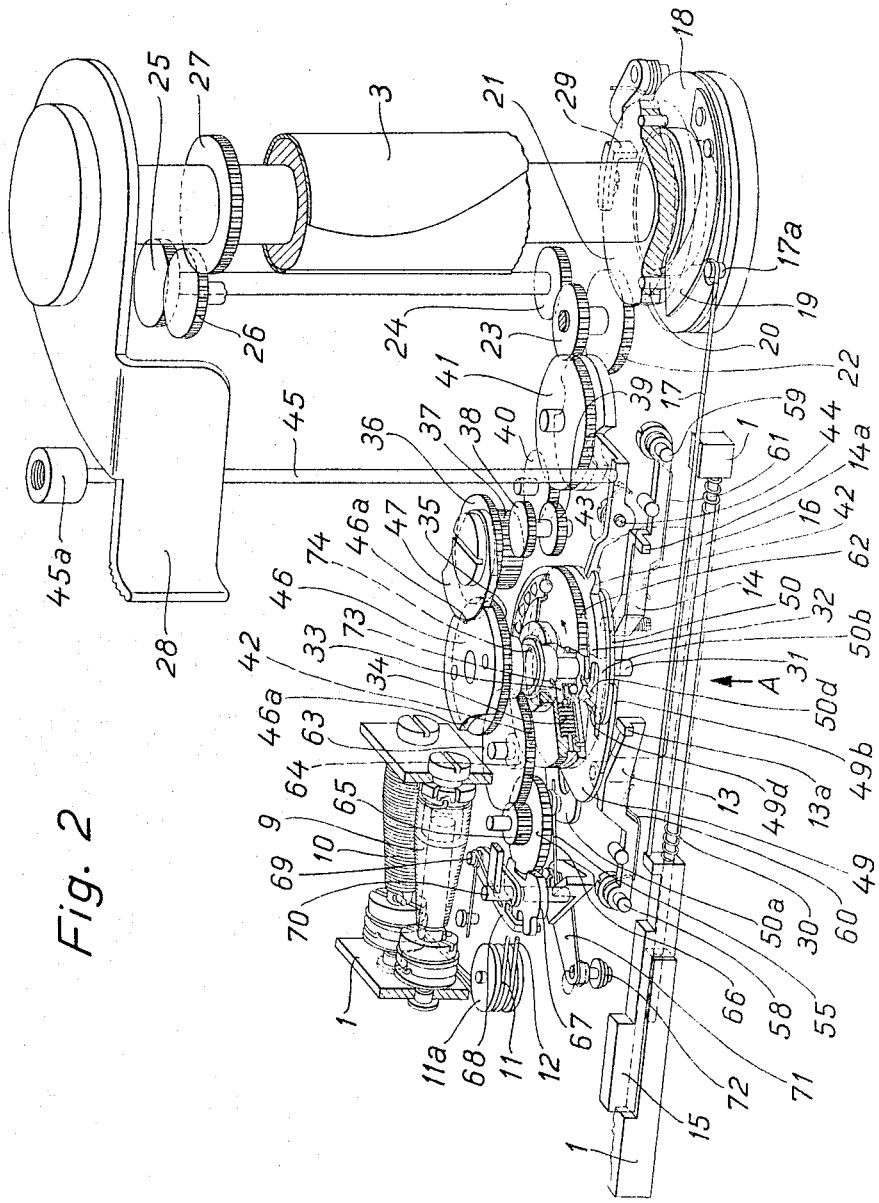
FIGURE 2 shows a view in perspective of the time controlling mechanism, the shutter-windup drive, and the film transportation device.

Each of the slide plates 7 and 6 is tensioned to advance to the left through the use of helical springs 9 and 10, respectively. Springs 9 and 10 shown in FIGURE 2 are suitably mounted in the camera housing 1 and are loaded to provide tension on cables 11 and 12 which are suitably connected thereto. Cables 11 and 12 travel around idler pulley 11a and the forward ends are connected to slide plates 7 and 6 by pins 7d and 6d, respectively.

The slide plates 6 and 7 are retained in the tensioned position shown in FIGURE 1 through the use of blocking cams or latches 13a and 14a, respectively, which are part of the levers 13 and 14 shown in FIGURE 2. When released the slide plates travel to the left in FIGURE 1; this aspect will be subsequently explained. While this embodiment of the invention is discussed relating to slide plates, it is understood that the construction disclosed herein can be adapted for the slit type rotary disc shutter means.

For winding-up the shutter, a guide member 15 is slidingly supported upon rod 16 which is located beneath the exposure gate 5.

The guide member 5 has a cable 17 attached thereto as shown in FIGURE 1 and the other end of the cable 17 is fastened to a peg 17a shown on grooved pulley 18 which forms part of a clutch coupling with the take-up reel 3.

In retensioning the shutter the following procedure takes place: as the rewind lever 28 is actuated, the take-up roller 3 is turned accordingly and through the clutch means tension is provided on cable 17 to pull guide member 15 to the right, as shown in FIGURE 2. In pulling guide member 15 to the right, lobe 6c of slide 6 is pushed to the right along with guide member 15. Slide 7, which is positioned in front of slide 6, is also pushed to the right by slide 6. The slide member 15 moves to the right until the blocking cams 13a and 14a drop behind the shaped lobes of the slides 6 and 7.

In order to permit guide member 15 to return to the position shown in FIGURE 1, after the slides 6 and 7 are in their tensioned position, the following arrangement is provided:

The take-up reel 3 is provided with a grooved roller 18 which is rotatably mounted thereon. There is a leaf spring 19 attached to pulley 18, as shown, with the free end of the leaf member pushing upwardly, as shown in FIGURE 2.

There is a gear 21 fixed to rotate with the take-up reel 3 and this gear 21 has two peg members 20 inserted therein as shown. Gear 21 is rotated through the gear train assembly made up of intermediate gears 22 through 27, as shown, and is thereby connected with the wind-up lever 28. When the wind-up lever 28 is actuated, it will cause gear 21 to rotate in a counter-clockwise direction, and as it rotates, the free end of leaf spring 19 will be caught against the peg member 20 to thereby rotate pulley 18. As previously mentioned, when pulley 18 is rotated, it causes guide member 15 to be moved to the right as shown in FIGURE 2 to thereby place the slides 6 and 7 in their tensioned positions.

After about a half revolution of the pulley 18, the leaf spring 19 will run under the stationary member 29 which is suitably attached to the camera housing. In running under member 29, the leaf spring 19 is pushed downwardly to cause it to slide off the peg 20 thereby disengaging pulley 18 from gear 21. When disengaged, a spring 30 which was compressed and located on rod 16 will thereafter push guide member 15 to the left as shown in FIGURE 2.

In order to release slides 6 and 7 at the correct time to obtain the correct exposure time, the following construction is used: The time exposure controlling means of this invention consists of a run-off column 32 and a wind-up column 31. Wind-up column 31 is rotatably mounted in the camera housing and a core member 33 is fixed on wind-up column 31 to rotate therewith.

Figure 5A:
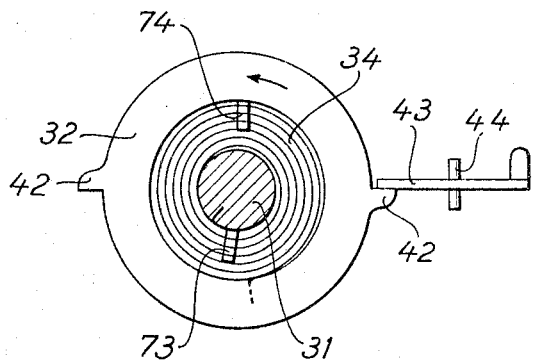
FIGURE 5a shows the run-off column in the tensioned position.
Figure 5B:
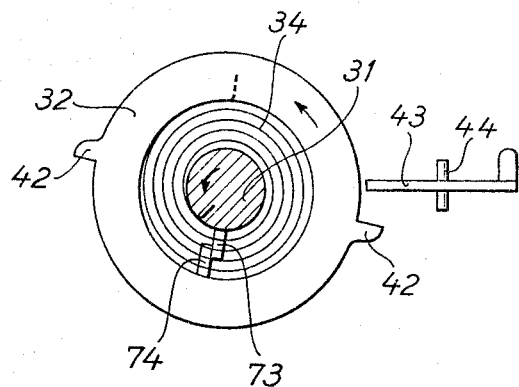
FIGURE 5b shows the position of the run-off column after the shutter is run down.

The run-off column 32 is rotatably mounted on the core member 33 and forms part of the housing in which helical spring 34 is located. Helical spring 34 is connected to the core member 33 and the run-off column 32, as shown in FIGURES 5a and 5b, and serves as the force storage unit for the run-off column 32.

At the upper end of the wind-up column 31 there is a gear 35 which is fixed to the wind-up column 31 to rotate therewith. Gear 35 is operatively connected to the wind-up lever 28 through the gear train assembly consisting of intermediate gears 36 through 41 as well as gears 23 through 27.

In addition to tensioning the shutter, as previously explained, when gear lever 28 is actuated, it also advances the film and simultaneously causes the turning of wind-up column 31 along with core member 33 of the spring housing.

As the wind-up column 31 is rotated the helical spring 34 is tensioned and during this time the run-off column 32 is prevented from rotating by a cam member 42 which comes to rest against pawl member 43. This pawl member 43 is constructed as a 2-arm lever which can be rotated about peg 44. One arm of pawl means 43 is in contact with release bar 45, which has a release button 45a which appears on the outside of the camera body. When the release button 45a is depressed it pushes downwardly on release bar 45, which in turn pushes downwardly on the one arm of the pawl means 43 to release the cam 42 on run-off column 32. Run-off column 32 in turn is driven by helical spring 34 in the direction of the arrow shown.

During the run-off of column 32 the wind-up column 31 is prevented from turning by the action of two cams 46 and 47. Cam 46 is fixed to rotate with wind-up column 31, whereas cam 47 is fixed to rotate with the adjacent gears 36 and 37. During the time that run-off column 32 is rotating, the cam 47 engages a mating recess 46a of cam 46 to thereby prevent the rotating of wind-up column 31. The co-action between cam 47 and one of the recesses 46a also secures the wind-up column 31 against undesired turning during the tensioned state of the shutter. The cam member 47 is disengaged from the recesses 46a only during the winding up of the shutter and is operatively connected with the re-wind lever mechanism by suitable means.

Gear 36 may have a few teeth missing thereon which enable the cam 47 to be rotated out of the recesses 46a which it happens to be in. After the cam 47 has rotated out, the teeth on gear 36 will engage the teeth on gear 35 to rotate the wind-up column 31. Teeth will also be missing on gear 36 enabling cam 47 to enter the next cam recess 46a to lock the wind-up column.

Referring to FIGURE 3 there is shown the mechanism for setting the exposure of the shutter means. This mechanism includes two actuating cams 48 which are mounted on run-off column 32 to rotate therewith. The time setting levers 49 and 50 are in the shape of wound two arm levers. Lever 49 rotates about an axis 51 and has a curved arm 49a and an actuating arm 49b. The curved arm 49a is spring loaded to contact a cam 49c, which cam is fixed to rotate with a turnable time-setter 53 which is accessible from the outside of the camera. In the same manner the time-setting lever 50 is constructed as a 2-arm lever which is rotated about axis 52. Curved arm 50a is spring loaded to remain in contact with a cam 50c, which is also fixed to rotate with time setter or exposure setter 53. Both the cams 49c and 50c are located coaxially with respect to wind-up column 31. Time setting lever 49 acts upon pawl means 13, while time setting lever 50 acts upon pawl means 14 in a manner to be described hereinafter.

In order to set the exposure, the time setter 53 is turned one way or the other. In so turning, the cams 49c and 50c which are fixed to rotate therewith will thereby actuate curved arms 49a and 50a. This causes time levers 49 and 50 to rotate about their respective axes 51 and 52 and thereby cause actuation arms 49b and 50b to become opened or closed in a scissor-like manner.

Actuation arms 49b and 50b each have an inclined surface 49d and 50d, respectively, which rises toward the run-off columns 32 as shown in FIGURES 4 and 2. It is with these surfaces that the cam 48 will cooperate when the run-off column 32 is released. When the run-off column 32 rotates, the cam 48 will successively sweep across the inclined surfaces 49d and 50d. In sweeping across these surfaces, the cam 48 will cause the time setting levers 49 and 50 to tilt downwardly as shown in FIGURES 2 and 4. In order to permit the time-setting levers to tilt downwardly the levers 49 and 50 are mounted on their respective axes as follows:

FIGURE 4a shows the method of mounting the time-setting lever 50; the mounting of time-setting lever 49 is similar; however, only a discussion of lever 50 will follow:

As shown in FIGURE 4a, curved arm 50a is fixed to rotate with axle 52 and has two yoke members 50e attached to it. Time-setting lever 50 has a cylinder 50' attached thereto and the cylinder 50' is positioned between the yoke members 50e. A suitable axle is inserted through the yoke members 50e and the cylinder section 50'. This construction permits the actuation arm 50b to rotate with curved arm 50a and also to be tilted downwardly about axle 57 to actuate pawl means 14.

A similar setup is used for actuation arm 49b of time-setting lever 49 to permit it to be pushed downwardly to actuate pawl means 13. Pawl means 13 is a single arm lever which is pivotally mounted to rotate about axle 58 and is spring loaded by spring 60 to urge the pawl upwardly against actuation arm 49b.

Similarly, pawl means 14 is a single arm lever which is mounted to rotate about axle 59 and is also spring loaded by spring 61 to thereby maintain pawl means 14 in contact with actuation arm 50b.

As the run-off column 32 rotates, one of the cams 48a will first run over inclined surface 49d, which will cause actuation arm 49b to push downwardly on pawl means 13. When pawl means 13 is pushed downwardly, blocking cam 13a formed thereon will also travel downwardly to release slide 6. Similarly, cam 48 will sweep across the inclined surface 50d which will tilt actuation arm 50b downwardly, causing pawl means 14 to be depressed, thereby permitting blocking cam 14a to be disengaged from slide 7, thereby releasing slide 7.

When the shutter is released as mentioned, the run-off column turns 180° and when retensioning the shutter, the wind-up column 31 will be turned in the same direction for 180°. This means that for each full revolution of the run-off column 32, there are two shutter run-offs. To permit this, the run-off column 32 has two cam members 42 which are fixed to the run-off column 32 and are spaced with respect to each other by 180°. There are also two actuating cams 48 spaced 180° apart to actuate time-setting levers 49 and 50.

The cam plate 46 which is fixed to rotate with wind-up column 31 has two cutout portions 46a which are spaced from each other by 180°. Cam plate 47 has one curved portion which will alternately engage one cutout recess 46a and the other as the winding up of the shutter is performed. To allow for this, the number of teeth in gears 35 and 36 are in the ratio of 2:1.

In order to allow for a doubling of the speeds obtainable with the shutter means, the following construction is used:

The run-off column 32 has teeth formed along its external periphery to form a gear 62. The run-off column 32 is operatively connected with ratchet wheel 66 through a gear train assembly consisting of intermediate gears 63, 64, and 65, as shown in FIGURE 2.

Also connected with this apparatus is a braking armature 67 which pivots about axle 70. Axle 70 is fixed to setting lever 71 which carries a setting knob 72 which is accessible from the outside of the camera.

A lever 68 is pivotally mounted on axle 69 and is spring loaded as shown to urge braking armature 67 into engagement with ratchet wheel 66. By moving the setting knob 72 one way or the other the armature 67 may be engaged or disengaged from ratchet wheel 66. When the braking armature is disengaged from ratchet wheel 66, the run-off column 32 is free to rotate at its regular speed. When the armature 67 is engaged with ratchet wheel 66, there is a retardation of the speed at which the run-off column 32 rotates, thereby providing for additional shutter speeds.

FIGURES 5a and 5b show a special device which is used to prevent damage to pawl means 43 when the cams 42 hit thereagainst. This device consists of two stops or abutment elements 73 and 74. Stop 73 is fixed to rotate with wind-up column 31 and stop 74 is fixed to rotate with run-off column 32.

In the position shown in FIGURE 5a, the run-off column 32 is about to be released and will rotate when released, in the direction shown by the arrow.

FIGURE 5b shows a view in which the run-off column has rotated in a counter-clockwise direction and stop 74 has hit against stop 73, thereby stopping the rotation of run-off column 32. Note that in this view the run-off column 32 is stopped before cam 42 engages pawl means 43. Upon renewed tensioning of the spring 34, only wind-up column 31 will be turned, whereas the run-off column 32 will be prevented from rotating by cam 42 which is stopped by pawl means 43.

The following action takes place when wind-up lever 28 is actuated:

When wind-up lever 28 is actuated, the take-up reel 3 is rotated to advance the film. The device which limits the forward motion of the film is not included in the drawings and can include any known means. When the wind-up lever 28 is actuated gear 21 will turn, as previously explained, and in turning, the peg 20 attached thereto will engage leaf spring 19, as previously indicated. Roller 18, to which leaf spring 19 is attached, will then pull the slides 6 and 7 into position through the cable 17, as previously explained, and the slides 6 and 7 will be held in their tensioned positions by blocking cams 13a and 14a and the lobes on the pertaining slides as shown in FIGURE 1.

After about a half revolution of grooved roller 18 leaf spring 19 will be depressed by member 29 to enable the leaf spring 19 to slide under peg 20. The spring 30 will then return actuating member 15 into its left starting position shown in FIGURE 1 and the grooved roller 18 will also return to its starting position.

As wind-up lever 28 is actuated, gear 35 which is fixed to rotate with wind-up column 31 will also be driven through the action of the gear train assembly consisting of gears 23, 41, 40, 39, 38, 37, and 36. When gear 35 is rotated, the wid-up column 31 is turned. During the first stages of rotation cam plate 47 will leave one of recesses 46a of cam plate 46 to release the braking of wind-up column 31.

To release the braking action on the wind-up column 31, the run-off column 32 will also be rotated until cam 42 engages pawl 43. The cam plate 47 thereafter completes one full revolution, but the cam plate 46 along with the wind-up column 31 complete only a half revolution. During this rotation, spring 34 becomes tensioned so that the entire shutter means is now tensioned. At the end of this wind-up motion, the cam plate 47 will mesh with the other recess 46a of cam plate 46 which has now rotated to a position adjacent to cam plate 47.

The following is the procedure for setting the exposure time. When the time setter gear 53 is rotated, the cam discs 49c and 50c which are fixed to rotate therewith are compelled to follow this motion. As the cam discs 49c and 50c are rotated, the time setting levers 49 and 50 are rotated about their axes 51 and 52, so that the actuation arms 49b and 50b become closed or opened in a scissor-like manner, depending upon the extent to which the time setting gear 53 has been turned. Suitable spring means 53a retain the gear 53 in its set position.

As the actuation arms 49b and 50b come closer or farther apart, so do the inclined surfaces 49d and 50d. The distance between these inclined surfaces represents the time difference with which slides 6 and 7 are individually released.

Since the run-off column 32 rotates with the same velocity, the time difference with which the actuation cam 48 will sweep across the inclined surfaces 49b and 50b is, of course, greater when the time setting levers 49 and 50 are further apart from each other than when the said levers are closer together.

While the run-off column always rotates at a constant velocity, this velocity can be changed to a slower rate by the braking action of the pawl means 66. By this method two different exposure times are available, one for the regular speed without the use of the braking action, and the other slower time when the braking action is engaged. Accordingly, the time setter 53 is marked with two different exposure times for each exposure position.

When using the camera, it is first necessary to see whether or not the braking action as represented by the position of setting knob 72 is engaged or not in order that we will know whether or not the shutter will be operated at the regular speed or the slower speed. This, of course, is a nuisance when using the camera and this setup has been shown in the drawings only so as to render the drawings less complicated.

In the actual embodiment of this invention the exposure time may occur side by side upon the time-setting mechanism 53 and the armature 67, the time setter 53, as well as the cam plates 49c and 50c, may be connected to each other in an operative manner by known means. This is represented diagrammatically in FIGURE 4. These elements can be operatively connected so that for a certain position of the time setter 53, the armature 67, and therefore the braking device, can be switched in automatically. When such a construction is utilized, the cam plates 49c and 50c must jump back to their starting positions at the automatic reversal or each cam plate must be equipped with two identical sets of curves, one of which helps in setting of the exposure time when the braking device is not engaged, and the other which helps when the braking device is engaged. These have not been shown since they would unduly complicate the drawings.

The shutter is released by pushing down on release button 45a which actuates bar 45 which in turn acts upon pawl means 43 and causes it to rotate in a clockwise direction. Cam 42 is thereby released and run-off column 32 is rotated in the direction shown through the action of spring 34.

An actuating cam 48 at the bottom side of the run-off column 32 will then sweep across inclined surface 49d. By this action, actuation arm 49b is tilted downwardly as shown in FIGURE 2 and will actuate pawl means 13 and thereby release blocking cam 13a, permitting slide 6 to be pulled to the left by cable 11 which is under tension by spring 9.

Depending upon how far apart the time-setting levers 49 and 50 have been opened, the actuating cam 48 will eventually sweep across inclined surface 50d as the run-off column 32 continues to rotate. Actuation arm 50d will then be tilted downwardly and will actuate pawl means 14 and thereby disengage blocking cam 14a from slide 7. Slide 7 will then be drawn to the left by cable 12 which is under the action of spring 10 and will again close the exposure gate. The camera is now ready to be re-set for taking another picture.

It will be understood that this invention is susceptible to modification in order to adapt it to different usages and conditions and accordingly, it is desired to comprehend such modifications within this invention as may fall within the scope of the appended claims.

What is claimed is:

1. Shutter mechanism for a camera comprising; a camera body, two slide plate means movably mounted in said body to be more independent of each other from a tension position to a rest position to expose a negative, one of said slide plates being in film exposing position in its rest position and the other of said slide plates being in film exposing position in its tensioned position, means to drive said slide plate means from their tensioned position to their rest position and return means to return them to their tensioned position, latch means to hold the respective said slide plate means in their tensioned positions and individually actuatable to release the respective said slide plate means, and exposure controlling means mounted in said camera operable to effect the individual actuation of said latch means to individually release said slide plate means, said exposure controlling means comprising run-off column means and wind-up column means are rotatably mounted in said camera body, said wind-up column means being rotatable only in one direction and being connected to said return means for actuation thereby during movement of said slide plate means to their tensioned position, biasing means connected between said wind-up column means and said run-off column means for biasing said run-off column means for rotation in said one direction and energized by said rotation of said wind-up column means, means holding said run-off column means against rotation during rotation of said wind-up column means, means for releasing said run-off column means to the influence of said biasing means, and means operated by said run-off column means during rotation thereof for sequentially and individually actuating said latch means to release first said one slide plate means and then said other slide plate means.

2. The shutter mechanism as claimed in claim 1 in which said biasing means comprises torsion spring means connected to said run-off column means and to said wind-up column means and adapted to be tensioned by rotation of said wind-up column means and to drive said run-off column means when the latter is released.

3. The shutter mechanism as claimed in claim 2 further comprising, a core member fixed to rotate with said wind-up column means and forming a first inner portion of a housing for said spring means, said run-off column means having a cylindrical portion forming a second outer portion of a housing for said spring means, said spring means having its one end connected to said core member and its other end connected to said cylindrical portion of said run-off column means.

4. The shutter mechanism as claimed in claim 3 in which said run-off column means is operable to actuate said latch means more than once during one complete revolution thereof, said run-off column means having latch actuating cam means and blocking cam means thereon which are present in a number which is correlated to the number of times the shutter mechanism is released for one complete revolution of said run-off column means, and means cooperating with said blocking cam means to halt said run-off column means as many times during one revolution thereof as the run-off column means actuates said latch means.

5. Shutter mechanism for a camera comprising; a camera body, two slide plate means slidably mounted in said body to be moved independently of each other from a tensioned position to a rest position to expose a negative, one of said slide plates being in film exposing position in its rest position and the other of said slide plates being in film exposing position in the tensioned position, resilient means connected to said slide plate means to drive said slide plate means from tensioned position to rest position and return means connected to said slide plate means to return them to their tensioned positions, latch means to hold the respective said slide plate means in their tensioned positions and individually actuatable to release the respective said slide plate means, exposure controlling means mounted in said camera operable to effect individual actuation of said latch means to individually release said slide plate means, said exposure controlling means comprising a run-off column means and wind-up column means rotatably mounted in said camera body, a core member fixed to rotate with said wind-up column means and forming a first inner portion of a housing, said run-off column means having a cylindrical portion forming a second outer portion of a housing, torsion spring means in said housing connected between said core member and said cylindrical portion for driving said run-off column means, means for holding said run-off column in a tensioned position and means for releasing said run-off column permitting it to rotate, elements of abutment means fixed on said wind-up column means and on said run-off column means to rotate therewith, elements being so positioned as to engage each other and stop the rotation of said run-off column means after it is released, said wind-up column means being rotatable only in one direction and being connected to said return means for actuation thereby during movement of said slide plate means to their tensioned position, and means operated by said run-off column means during rotation thereof for sequentially and individually actuating said latch means to release first said one slide plate means and then said other slide plate means.

6. The shutter mechanism as claimed in claim 5 in which said means for holding said run-off column means in tensioned position comprises at least one blocking cam fixed thereon to rotate therewith and pawl means positioned in said camera body to engage said blocking cam, and said means for releasing said run-off column means comprising a release mechanism to actuate said pawl means to disengage it from said blocking cam, said pawl means engaging said blocking cam when said shutter mechanism is in the tensioned state as well as during the tensioning of said shutter mechanism.

7. The shutter mechanism as claimed in claim 6 further comprising, a lock means normally engaged with said wind-up column means to prevent rotation of said wind-up column means during the tensioned state and during the running off of said run-off column means, and means operated by actuation of said return means for releasing said lock means to permit rotation of said wind-up column means thereby.

8. The shutter mechanism as claimed in claim 7 in which said lock means comprises a first cam member fixed to rotate with said wind-up column means and having at least one recess thereon and a second cam member connected to said return means to be actuated thereby, said second cam member having a cam surface thereon mating with said recess to prevent rotation of said wind-up column means during the tensioned state and during rotation of said run-off column means, said cam surface being released from said recess in response to actuation of said return means to permit said wind-up column means to be rotated by said return means.

9. The shutter mechanism as claimed in claim 8 in which said means operated by said run-off column means during rotation thereof to actuate said latch means to release said slide plate means comprises first and second exposure setting lever means each operatively associated with a pertaining latch means and moveable to actuate the said latch means, each said lever means having a cam region for engagement to move the pertaining lever to actuate its latch means, at least one actuation cam member fixed on said run-off column means to rotate therewith and operable during rotation of said run-off column means to act in succession upon the said cam regions of said exposure setting lever means to move the same to actuate said latch means to thereby release said slide plate means in succession.

10. The shutter mechanism as claimed in claim 9 in which said first and second exposure setting lever means are adjustable relative to each other in the circumferential direction of said run-off column means so that the time between the movement of said first and second exposure lever means by said actuation cam member on said run-off column means can be varied.

11. The shutter mechanism as claimed in claim 10 further comprising, first and second cam plate means which are coaxially and rotatably mounted in said body and each operatively associated with a pertaining one of said exposure setting lever means for adjusting the same relative to each other, spring means biasing said first and second exposure setting lever means against the pertaining first and second cam plate means, and an exposure setting dial accessible from the outside of said camera body and connected to said first and second cam plate means and operable to rotate them in response to the exposure time selected.

12. The shutter mechanism as claimed in claim 11 in which said run-off column means rotates at a constant velocity during run-off, and further comprising braking means connected to said run-off column means and which can be made selectively effective or ineffective to retard the velocity of said run-off column means during rotation thereof as said slide plate means move from their tensioned positions to their rest positions to expose a film and thereby provide a range of slow exposure speeds.

13. Shutter mechanism for a camera comprising, a camera body, first and second slide plate means slidably mounted in said body to be moved independently of each other from a tensioned position to a rest position to expose a film, spring means connected to said slide plate means to drive said slide plate means from their tensioned position to their rest position, means connected to the slide plate means to return them to their tensioned position, a latch for each slide plate means engageable therewith to hold the pertaining said slide plate means in its tensioned position and actuatable to release the pertaining said slide plate means, exposure controlling means mounted in said camera to individually actuate said latches to release said slide plate means sequentially and comprising a run-off column means and a wind-up column means rotatably mounted in said camera body, spring means to drive said run-off column means, said spring means being connected between said run-off and wind-up column means to tension said run-off column means in response to rotation of said wind-up column means, means for holding said run-off column means in tensioned position and selectively operable for releasing said run-off column permitting it to rotate under the influence of said spring means, first and second time exposure setting lever means operatively associated with the respective latches of said first and second slide plate means, said lever means being moveable to actuate their respective latches and including cam regions thereon, at least one actuation cam fixed on said run-off column means to rotate therewith and operable to act on the cam region of said first exposure setting lever means to actuate the pertaining latch to release said first slide plate means and thereafter act on the cam region of said second exposure setting lever means to actuate the pertaining latch to release said second slide plate means when said run-off column means is released to rotate, and means to rotate said wind-up column means in only one direction during tensioning of said shutter mechanism, said run-off column means rotating in the same one direction only during operation of said shutter mechanism to expose a film.

14. The shutter mechanism as claimed in claim 13 further comprising, first and second cam plate means which are coaxially and rotatably mounted in said body operatively associated with said exposure setting lever means for adjusting the same relative to each other, spring means to bias said first and second exposure setting lever means against the pertaining first and second cam plate means, and an exposure setting dial accessible from the outside of said camera body and connected to said first and second cam plate means operable to rotate them in response to the exposure time selected.

15. The shutter mechanism as claimed in claim 14 in which said run-off column means rotates at a constant velocity during movement of said slide plate means from their tensioned to their rest positions and further comprising braking means operatively connected to said run-off column means and which can be selectively switched in and out of operation for selectively retarding the velocity of said run-off column means during said movement of the slide plate means from their tensioned to their rest positions thereby to provide a range of slow exposure speeds.

References Cited by the Examiner

UNITED STATES PATENTS

| | | | |
|---|---|---|---|
| 2,408,549 | 10/1946 | Brueske | 95—55 |
| 2,671,390 | 3/1954 | Smith | 95—55 |
| 3,078,776 | 2/1963 | Okabe | 95—55 |

JOHN M. HORAN, *Primary Examiner.*